US011182058B2

(12) United States Patent
Wong et al.

(10) Patent No.: US 11,182,058 B2
(45) Date of Patent: Nov. 23, 2021

(54) KNOWLEDGE MANAGEMENT SYSTEMS AND METHODS

(71) Applicants: Atlassian Pty Ltd, Sydney (AU); Atlassian, Inc., San Francisco, CA (US)

(72) Inventors: Vincent Chi-Kit Wong, Sydney (AU); Ryan Medolago Verderio, Sydney (AU); Millicent Lillian Maier, Sydney (AU); Peter Christopher Grasevski, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 237 days.

(21) Appl. No.: 16/217,757

(22) Filed: Dec. 12, 2018

(65) Prior Publication Data
US 2020/0192534 A1 Jun. 18, 2020

(51) Int. Cl.
| | | |
|---|---|---|
| *G06F 3/0484* | (2013.01) | |
| *G06F 16/955* | (2019.01) | |
| *G06F 3/0481* | (2013.01) | |
| *H04L 29/06* | (2006.01) | |
| *G06F 16/9038* | (2019.01) | |

(52) U.S. Cl.
CPC .......... *G06F 3/0484* (2013.01); *G06F 3/0481* (2013.01); *G06F 16/9038* (2019.01); *G06F 16/9558* (2019.01); *H04L 65/403* (2013.01)

(58) Field of Classification Search
USPC ................................................ 707/728, 694
See application file for complete search history.

(56) References Cited

U.S. PATENT DOCUMENTS

| | | | | |
|---|---|---|---|---|
| 6,615,240 | B1 * | 9/2003 | Sullivan | G06Q 30/02 709/205 |
| 7,194,480 | B2 * | 3/2007 | Shalabi | G06F 9/465 |
| 7,590,687 | B2 * | 9/2009 | Bales | H04L 63/10 707/999.1 |
| 7,890,405 | B1 * | 2/2011 | Robb | G06F 9/54 705/36 R |
| 9,639,609 | B2 * | 5/2017 | Li | G06F 16/248 |
| 9,817,562 | B2 * | 11/2017 | Keel | G06F 16/29 |
| 2003/0097410 | A1 * | 5/2003 | Atkins | H04L 29/12594 709/206 |
| 2006/0106847 | A1 * | 5/2006 | Eckardt, III | G06F 16/3323 |
| 2007/0067297 | A1 * | 3/2007 | Kublickis | G06Q 20/29 |

(Continued)

*Primary Examiner* — Cam Linh T Nguyen
(74) *Attorney, Agent, or Firm* — Brownstein Hyatt Farber Schreck, LLP

(57) ABSTRACT

Described herein is a computer implemented method. The method comprises receiving user input in a user input control, communicating the user input or data derived therefrom to a query redirection record system, and receiving a search result set from the query redirection record system. The search result set includes one or more query redirection records, each query redirection record including a link which provides a location of help content which the query redirection record is associated with. The method further comprises displaying one or more of the query redirection records received in the search result set, each displayed query redirection record being displayed with a link control which, when activated, redirects to the help content the query redirection record is associated with.

20 Claims, 6 Drawing Sheets

(56) References Cited

U.S. PATENT DOCUMENTS

| | | | | |
|---|---|---|---|---|
| 2010/0229080 A1* | 9/2010 | Roulland | ................ | G06N 5/02 |
| | | | | 715/205 |
| 2011/0078243 A1* | 3/2011 | Carpenter | ............... | H04W 4/00 |
| | | | | 709/204 |
| 2011/0208822 A1* | 8/2011 | Rathod | ............... | G06F 16/9535 |
| | | | | 709/206 |
| 2012/0191716 A1* | 7/2012 | Omoigui | ........... | H01L 27/14647 |
| | | | | 707/740 |
| 2014/0040233 A1* | 2/2014 | Ozonat | ................ | G06F 16/355 |
| | | | | 707/709 |
| 2014/0067702 A1* | 3/2014 | Rathod | ................ | G06Q 10/10 |
| | | | | 705/319 |
| 2015/0006492 A1* | 1/2015 | Wexler | ................ | G06F 16/248 |
| | | | | 707/694 |
| 2015/0127628 A1* | 5/2015 | Rathod | ................ | G06F 16/955 |
| | | | | 707/710 |
| 2015/0356089 A1* | 12/2015 | Jamrog | ................ | G06F 16/951 |
| | | | | 707/723 |
| 2016/0140232 A1* | 5/2016 | Smirnov | ............ | G06F 16/3338 |
| | | | | 707/768 |
| 2016/0162172 A1* | 6/2016 | Rathod | ................ | G06F 9/451 |
| | | | | 715/747 |
| 2018/0097877 A1* | 4/2018 | Johnson | ................ | H04L 67/06 |

\* cited by examiner

KNOWLEDGE MANAGEMENT SYSTEMS AND METHODS

TECHNICAL FIELD

The present disclosure is directed to knowledge management systems and methods.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Over time, organizations and their employees build up vast amounts of knowledge in digital form. The management of such knowledge presents difficult and well-known problems: how to capture the knowledge individuals possess in an appropriate digital form and how to store the digital form of the knowledge in a way that facilitates discovery/surfacing of the knowledge at the appropriate time.

As organizations grow so too does the amount of captured knowledge (i.e. the knowledge base). As the knowledge base grows the above-mentioned problems become even more difficult.

Consider, for example, an organization that runs an internal wiki as its knowledge management tool and a user who is looking for knowledge on a topic: for example, how to connect to the organizations wireless network. If the organization's wiki has 100 pages, maintaining the knowledge base and searching for relevant content is relatively straightforward. In this case, the size of the knowledge base is such that the computing resources involved in searching the knowledge base (e.g. processing, memory, and communication bandwidth) are relatively small. Furthermore, even if an unsophisticated search is performed there are unlikely to be too many results, in which case even if results of peripheral (or no) relevance are returned, manually filtering those results by the end user can be done with reasonable efficiency. In such a scenario, if the answer to the user's query is in the knowledge base there is a reasonable likelihood that it will be found, and the user's query resolved.

In contrast, an organization with a wiki of 10,000,000 pages faces a vastly different challenge. In this case, the computer resources involved in storing and searching the knowledge are no longer trivial, and there is a far greater likelihood that a search will return a result set that is either difficult or impossible for a user to make use of. For example, if a search returns 1000 (or more) pages, one (or more) may have the required information, some may have out of date information, some may appear to be relevant on a cursory review but end up not being relevant. Either way, manually perusing 1000 results is infeasible for the user, so the user may well abandon their search and look for other avenues to solve his or her query (for example raising a service/help desk issue that consumes more of the organization's resources—computing and human).

The knowledge management problems mentioned above are still further exacerbated where an organization's knowledge is maintained across/stored within multiple different systems—as is often the case. For example, consider an organization that runs a wiki platform, a help desk/support platform, an instant messaging platform. In this case, knowledge ends up being embedded in all systems: in pages of the wiki, in issues or tickets maintained by the help desk/support platform, in chat dialogues/messages within the instant messaging platform. This creates even further difficulties as now the knowledge a user is after may be stored on one or all the platforms. A comprehensive search must therefore search across all platforms which increases the complexity of the search and the potential for large numbers of results that are of no or peripheral relevance to be returned.

The examples above illustrate two challenges that arise in knowledge management systems. One challenge arises in the actual processing involved in performing a search of digital knowledge content: i.e. the computer resources (processing, memory, and communications bandwidth) required to perform a search efficiently. While faster searching can be always achieved by using more powerful computing systems (e.g. with faster/additional processors and/or additional memory resources), it would be more desirable to make the search itself more efficient.

Another challenge is providing for a search of digital knowledge content that reduces the number of search results returned that are of no or peripheral relevance. This problem cannot be solved by simply providing more powerful computing systems—if a search process returns 1000 irrelevant results for a given query, using more powerful computing resources to return those irrelevant results faster does not improve the usefulness/relevance of the result set.

SUMMARY

The appended claims may serve as a summary of the invention.

Figure 1:
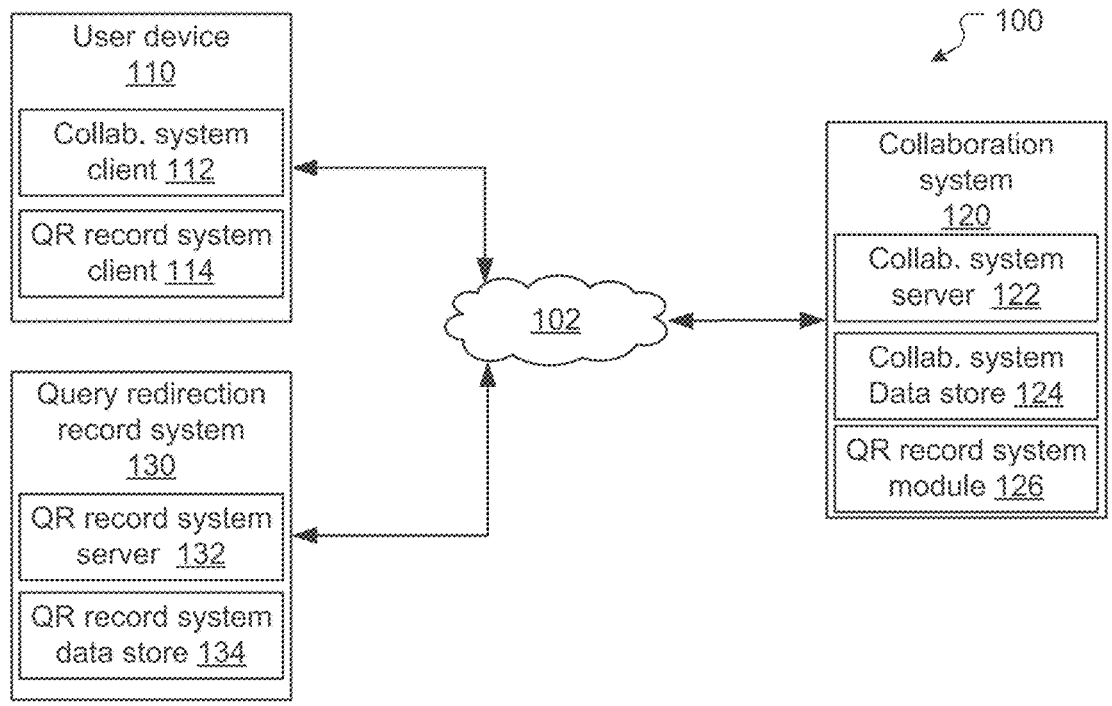
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form to avoid unnecessary obscuring.

To facilitate knowledge management, the present application introduces and makes use of query redirection records (QR records for short). QR records are described in detail below. This is followed by an overview of a system environment in which QR records can be created, stored, and discovered, and an example of a computer system suitable for performing operations in such an environment. The way QR records are created and stored will then be described, followed by the way QR records are discovered and used.

Query Redirection Records

To facilitate knowledge management, the present application introduces and makes use of Query redirection records (QR records). Generally speaking, QR records are lightweight and easily searchable digital objects. Each QR record addresses a particular query and provides a pointer/link which, when activated by a help seeker, initiates a first step in resolving the query to which the QR record relates.

The specific data captured by a QR record (and the format thereof) will vary depending on implementation. In the embodiments described herein, however, a QR record includes the following fields: a title field; a label field; a content field; a link field; and a creator field. Additional fields (optional or mandatory) may also be provided for, for example: a creation date field; an updated date field; a comments field; a team/organization field; a categories field; a status field (e.g. draft/publish); a permissions field (defining access permissions); a view count field; a help count field; a reactions field.

The QR record title is used to indicate the issue to which the QR record relates. In certain embodiments, the QR record title provides an answer to the question beginning with: "How do I:". For example, a help provider wanting to create a QR record to assist help seekers connect to the company WiFi may create a QR record with the title: "How do I connect to the company WiFi?".

The QR record label field is used to store one or more labels that can be used for classification and discovery purposes.

The QR record content field is used to store content that is displayed when the QR record is accessed. For example, for the QR record with the title "How do I: connect to the company WiFi?", the content may simply indicate that the file linked to by the QR record should be viewed—e.g. "See here for WiFi connection information:" (followed by the link/pointer stored in the link field as discussed next). As a further example, if the title of the QR record is "How do I: get an illustration made?", the content may be something like "You can create a card on the illustration team's backlog on Trello and we will get to it asap:" (followed by the link to the illustration team's Trello board in the link field).

The QR record link field is used to store a link to the first (and potentially only) step that should be taken to resolve the query to which the QR record relates.

In some cases, the QR record link field may provide a link to a file (and appropriate application for displaying the file) that contains knowledge content which resolves—or provides the first step in resolving—the query to which the QR record relates. In this context, a file is any collection of data capable of storing knowledge content and being presented to a user. By way of example, a file could be: a text file; a word processing document; a spreadsheet; a presentation file; a pdf file; an image file; a video file; an audio file; an html file; an instant message dialogue; and/or any other type of electronic file. For example, for a QR record with the title "How do I: connect to the company WiFi?", the link may point to a HTML page (launched in a web browser) that provides detailed information on connecting to the company WiFi.

In other cases, the QR record link field may provide a link to an interactive object (and appropriate program/tool for interacting therewith) that provides the first (and potentially final) step for a help seeker to take to resolve the query to which the QR record relates. For example, if the title of the QR record is "How do I: get an illustration made?", activation of the link may cause a Trello card creation interface to be launched. Other interactive objects are possible. For example, a link for a given QR record may cause an issue tracking system issue creation interface to launch. Further, the issue creation interface may be prepopulated with certain data relevant to the query in question, such as a title, the team to which the issue is to be submitted, and/or other data). For example, a QR record for creating a user account for service x may be created with the title "How do I: create a user account for x?", and the content read 'Log a support issue here'. In this case the link may point to an issue tracking system ticket that is prepopulated with the most appropriate title for the task (e.g. 'User account creation for 'x'), tagged with the most appropriate tags (e.g. service x, user account creation), and already include any relevant queueing information (e.g. the individual or team responsible for creating accounts for service x). Following such a link prevents the user from having to create an issue from scratch and creates an issue in a form that can most efficiently be dealt with by the support team (e.g. a form with an appropriate title, tags, and queuing information which, if not prepopulated, could be entered erroneously by the user).

The QR record creator field is used to store information allowing the creator of the QR record to be identified. This may, for example, be a name, an employee/contributor ID, or any other identification means. In some case the creator may be a designated role (e.g. sysadmin) or team (e.g. legal) rather than an individual person.

Relevantly, in all but the most trivial cases the data for a QR record does not actually resolve the query to which the QR record relates. Rather, the QR record simply provides a link to the solution (or the first step in the solution) and provides sufficient information for the question to which the QR record relates to be identified. In the above scenario, for example, a QR record with the title "How do I: get an illustration made?", a link, and content of "You can create a card on the illustration team's backlog on Trello and we will get to it asap:" does not itself resolve a user's query of getting an illustration made: rather, the user must follow the link to start this process. Similarly, a QR record with the title "How do I: connect to the company WiFi?", content of "See here for WiFi connection information:" and a link to a page does not actually tell the user how to connect to the WiFi: rather, the user must go to the linked page.

By keeping actual help content out of the QR records they are kept small (from a data size/memory requirement perspective), easily searchable, and easily consumable.

By way of specific example, the format of a QR record may be as shown in Table A:

TABLE A

Example QR record format

```
{
    title: string,              // record title/question. 150 character limit
    content: string,            // record content/answer. 500 character limit.
    labels: string[ ],          // an array (or list) of strings, each one representing one label
    creatorId: string,          // the ID of the creator, or some way to identify them
    cloudId: string,            // the ID of the cloud instance the record was created on
    containerId: string,        // the ID of the container that the record was created within -
                                for example, a room ID in a chat app, or a team ID
    permissions: {
        isVisible: boolean,     // whether the user can view the record
        isEditable: boolean,    // whether the user can edit the record
    },
    createdDate: timestamp,     // the time the record was created
    updatedDate: timestamp,     // the time the record was updated
    userAId: string[ ],         // the IDs of the users who created or updated the record
    rating: float,              // decimal number indicating current rating
    popularity: float           // number representing the popularity of the record (based on
                                shares and views)
}
```

In the example QR record format of Table A, rather than providing a separate link field the link for the QR record is stored in the content field. A separate link field could, of course, be provided.

Alternative QR record structures with additional or alternative fields (and/or field types) are possible. Relevantly, however, whatever structure is chosen (and whatever fields are included), QR records should be kept lightweight. This reduces storage requirements and facilitates efficient searching.

Environment Overview

FIG. 1 illustrates an example environment 100 in which embodiments and features of the present disclosure are implemented. Example environment 100 includes a communications network 102 which interconnects a user device 110, a collaboration system 120, and a QR record system 130.

User Devices

User device 110 is a computer processing system operated by an end user. User device may be used by a help provider (who creates QR records) or a help seeker (who consumes QR records). A single user may, of course, be both a help provider and a help seeker. In the illustrated embodiment, user device 110 has a collaboration system client application 112 and a QR record system client application 114 installed thereon. User device 110 will also have other applications installed/running thereon, for example an operating system.

When executed by the user device 110 (e.g. by a processor such as processor 204 described below), the collaboration system client application 112 configures the user device 110 to provide client-side collaboration system functionality. This involves communicating (using a communication interface such as 218 described below) with the collaboration system 120 (and, in particular, the collaboration system server 122). The collaboration system client application 112 may be a dedicated application client that communicates with a collaboration system application server using an API. Alternatively, collaboration system client application 112 may be a web browser (such as Chrome, Safari, Internet Explorer, Firefox, or an alternative web browser) which communicates with a collaboration system web server using http/https protocols When executed by the user device 110 (e.g. by a processor such as processor 204), the QR record system client application 114 configures the user device 110 to provide client-side QR record system functionality. This involves communicating with the QR record system 140 (and, in particular, the QR record system server 132). The QR record system client application 114 may be a dedicated application client that communicates with a QR record system application server using an API. Alternatively, QR record system client application 114 may be a web browser which communicates with a QR record system web server using http/https protocols.

While user device 110 has been shown with separate collaboration system and QR record system clients 112 and 114, a single application may be used. For example, user device may have a single web browser installed thereon which provides client-side functionality for both the collaboration system 120 and QR record system 130 (in which case the collaboration and QR record system servers 122 and 132 will be web servers).

Furthermore, user device 110 has been described as having a single collaboration system client 112 installed thereon. As discussed further below, however, environment 100 may include multiple different types of collaboration systems. In this case, user device 110 may have multiple collaboration system clients installed, each collaboration system client for interacting with one or more of the different collaboration systems 120.

User device 110 may be any form of computing device. Typically, user device 110 will be a personal computing device—e.g. a desktop computer, laptop computer, tablet computer, mobile phone, or other personal computing device.

Collaboration Systems

Various types of collaboration systems can be used with the present disclosure, and the precise functionality provided by the collaboration system will depend on this. Typically, a collaboration system 120 used in the present embodiments will be a system of the type that users use to seek help. By way of example, collaboration system 120 may be a wiki system (for example Confluence as made available by Atlassian), an issue tracking system (for example Jira as made available by Atlassian), a project management system (for example, Trello as made available by Atlassian), an instant messaging system (such as Slack) or any other type of collaboration system, an email platform (e.g. Gmail, Microsoft Outlook), service desk tools (e.g. Jira Service Desk, ServiceNow), or other specialized tools—e.g. HR tools such as Workday, finance tools such as Expensify, etc.

Regardless of type, collaboration system 120 includes a collaboration system server 122 and a collaboration system data store 124. The collaboration system server 122 configures the collaboration system 120 to provide server-side collaboration system functionality—the precise nature of which dependent on the type of collaboration system. Data used by the collaboration system in performing its functions is stored on the collaboration system data store 124.

Collaboration system server 122 may be a web server (for interacting with web browser clients) or an application server (for interacting with dedicated application clients). While illustrated with a single collaboration system server 122, the collaboration system 120 may provide multiple servers (e.g. one or more web servers and/or one or more application servers).

In certain embodiments, collaboration system 120 is a scalable system including multiple distributed server nodes connected to the shared data store 124 (e.g. a shared file server). Depending on demand from clients (and/or other performance requirements), collaboration system server 120 server nodes can be provisioned/de-provisioned on demand to increase/decrease the number of servers offered by the collaboration system server 120. Each collaboration system server 122 may run on a separate computer system and include one or more application programs, libraries, APIs or other software that implement server-side functionality. Similarly, collaboration system data store 124 may run on the same computer system as a collaboration system server 122 or may run on its own dedicated system (accessible to collaboration system server(s) 122 either directly or via a communications network).

The collaboration system server 122 (running on collaboration system 120) and collaboration system client application 112 (running on user device 110) operate together to provide collaboration system functionality.

Collaboration system 120 further includes a QR record system module 126. As discussed in further detail below, the QR record system module 126 provides the collaboration system 120 with client side QR record system functionality: that is, the QR record system module 126 enables the collaboration system 120 to communicate with the QR record system 130 to access and retrieve QR records. The collaboration system 120 can then cause retrieved QR records to be displayed on a user device 110 (e.g. on a display 212 thereof). The QR record system module 126 may be an integral component of the collaboration system server 122 or may be an add-on/integration to the server 122.

QR Record System

QR record system 130 includes a QR record system server 132 and a QR record system data store 134. The QR record system server 132 configures the QR record system 130 to provide server-side functionality—e.g. by receiving and responding to requests from user devices 110 (e.g. via a QR record system client 114 operating thereon) to create QR records and receiving and responding to requests from collaboration systems 120 to access/retrieve QR records (e.g. via a QR record system module 126).

QR record system server 132 may be a web server (for interacting with web browser clients) or an application server (for interacting with dedicated application clients). While QR record system 130 has been illustrated with a single server 132 it may provide multiple servers (e.g. one or more web servers and/or one or more application servers).

In certain embodiments, QR record system 130 is a scalable system including multiple distributed server nodes connected to the shared data store 134 (e.g. a shared file server). Depending on demand from clients (and/or other performance requirements), QR record system server nodes can be provisioned/de-provisioned on demand to increase/decrease the number of servers offered by the QR record system 130. Each QR record system server 132 may run on a separate computer system and include one or more application programs, libraries, APIs or other software that implement server-side functionality. Similarly, QR record system data store 134 may run on the same computer system as an QR record system server 132 or may run on its own dedicated system (accessible to QR record system server(s) 132 either directly or via a communications network).

While environment 100 has been provided as an example, alternative system environments/architectures are possible.

By way of specific example, in certain implementations the QR record system is implemented as a NodeJS server running the Express framework to accept incoming requests. The NodeJS server connects to a PostgreSQL database in which QR record data is stored. The NodeJS server is run on a cloud platform (e.g. AWS using an EC2 instance).

Hardware Overview

The embodiments and features described herein are implemented by one or more special-purpose computing systems or devices. For example, in environment 100 each of the user device 110, collaboration system 120, and QR record system 130 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
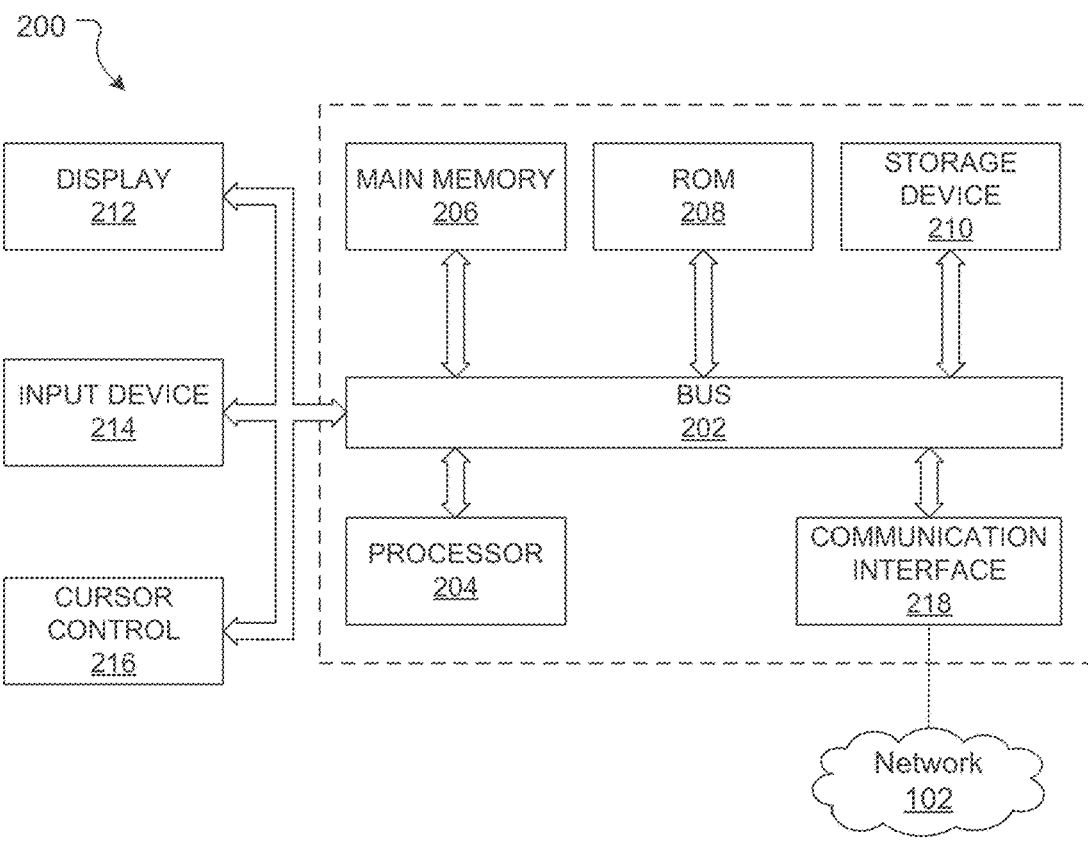
FIG. 2 is a block diagram of a computing system with which various embodiments of the present disclosure may be implemented.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general-purpose microprocessor, a graphical processing unit, or other processing unit.

Computer system 200 also includes a main memory 206, such as a random-access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as in a collaboration system 120 or QR record system 130), it will typically be provided with higher end hardware allowing it to process data, access memory, and perform network communications more rapidly than, for example, a user device (such device 110).

QR Record Creation

This section describes the processing performed to create and store a QR record.

Figure 3:
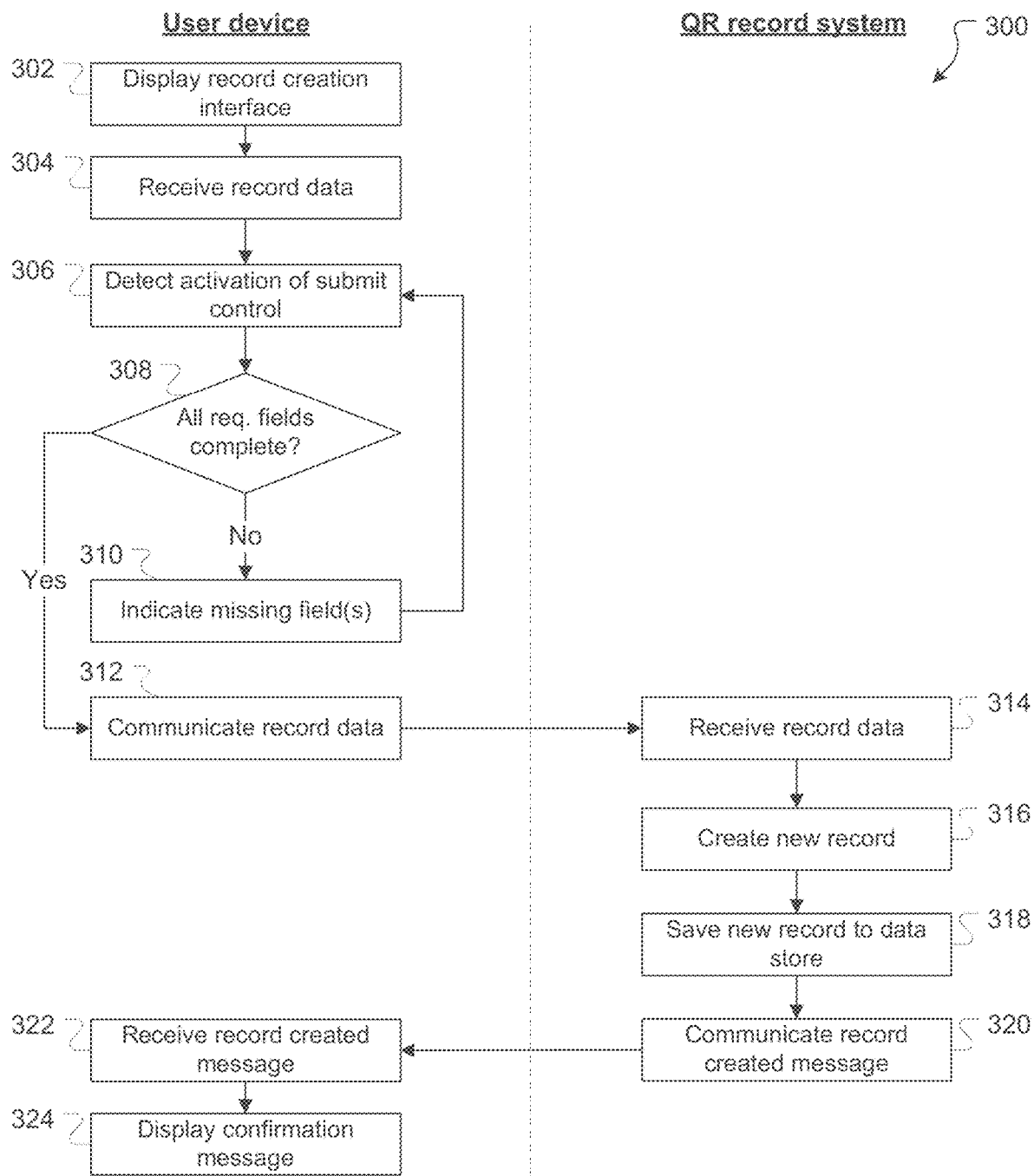
FIG. 3 is a flowchart indicating operations performed to create and store a Query redirection record.

In certain embodiments, QR records are created by users interacting with a QR record creation interface which is provided to a user via user device 110. The QR record creation interface may be provided by/accessed from various collaboration system client applications, however in the example below the QR record creation interface is accessed via the QR record system client 114. This will be described with reference to flowchart 300 of FIG. 3. In this example, operations of flowchart 300 that are described as being performed by the user device 110 are performed by the user device 110 under control of the QR record system client application 114. Similarly, operations of flowchart 300 described as being performed by the QR record system 130 are performed by the QR record system 130 under control of the QR record system server 132.

At 302, user device 110 displays a QR record creation interface (e.g. on a display such as 212). In certain embodiments, the QR record system client 114 is a web browser application and the QR record creation interface may be provided as a browser extension. To launch the QR record creation interface, any appropriate user interface control may be provided by the QR record system client 114—e.g. a 'create new QR record' button/link/menu item etc.

The QR record creation interface includes input controls which are used by the user creating the QR record to define the QR record data. The precise input controls provided depend on the data captured in a QR record. Continuing the example QR record from above, input controls may be provided for the title field, label field, content field, link field, and creator field.

Certain fields may be pre-populated (or not provided with input controls at all). For example, the creator field may be prepopulated with an identifier of the user who initiated creation of the QR record.

Figure 4:
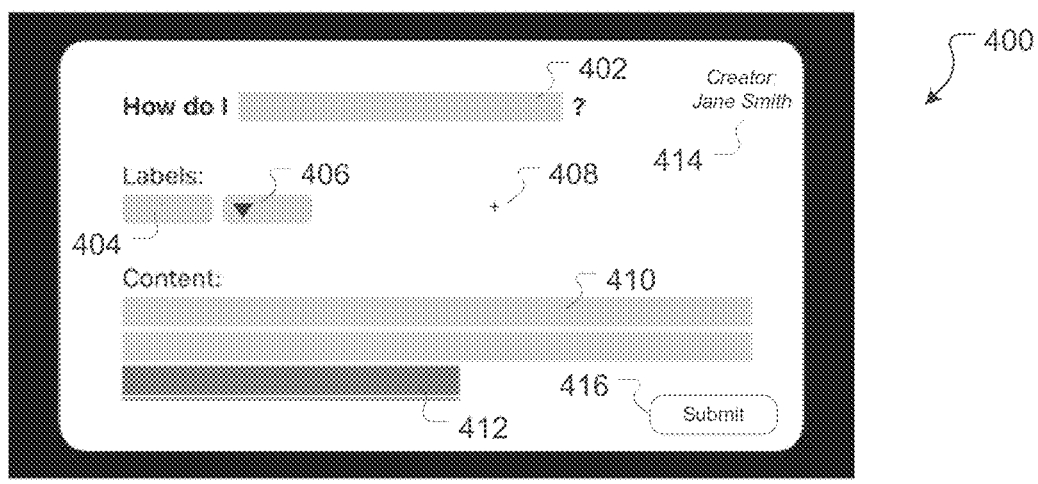
FIG. 4 is an example Query redirection record creation user interface.

FIG. 4 provides one example of a QR record creation interface 400 for display on a display of user device 110. QR record creation interface 400 includes a title input control 402 allowing text input to define the title of the QR record. Label controls are also provided allowing labels in respect of the QR record to be entered and/or selected. In interface 400 two different types of label controls are provided: a label entry control 404 (into which a user can enter text to either discover and select an existing label or create a new label) and a label selection control 406 (operable by a user to display/search/navigate through existing labels to choose an existing label to assign to the QR record). An add additional label control 408 is also provided allowing a user to add and define further labels in respect of the QR record. A content field 410 is provided for a user to input content information. A link field 412 is provided for a user to input the link. In this example, creator information 414 is also displayed, however is pre-populated with the name of the user creating the QR record. A submit control 416 is also provided.

At 304, the user device 110 receives QR record data. The QR record data is received by a user inputting information into the QR record creation interface (e.g. via an input device such as 214).

At 306, the user device 110 detects activation of a submit QR record control (e.g. control 416 or similar).

At 308, the user device 110 determines whether all required QR record fields have been completed and are of the correct format/type. If so processing proceeds to 310 and if not processing proceeds to 312. In certain embodiments all fields for which input controls are provided are required. In this case, detection of any field that has not been populated (or any field that has been populated with data that does not pass validation criteria for that field) will lead to a determination that the required QR record fields have not been completed. In alternative embodiments, some QR record fields may be optional—for example, labels may not be required and as such omitting a label will be acceptable.

At 310, the user device 110 has determined that one or more required fields has not been completed or is otherwise incorrect (e.g. due to data validation rules). In this case the user device 110 notifies the user to this. Notification may be in various ways, for example by emitting an audio tone, highlighting the incomplete field(s), and/or displaying an error message indicating which required field(s) is/are incomplete or incorrect (optionally with the data validation rule that has been contravened). Processing then returns to 304.

At 312, the user device 110 has determined that all required fields have been completed. In this case, the user device 110 communicates the QR record data (i.e. as input by the user and/or automatically generated/populated by the user device 110) to the QR record system 130 (specifically, to the QR record system server 132 running thereon).

At 314, the QR record system 130 receives the QR record data from the user device 110.

At 316, the QR record system 130 creates a new QR record which includes the QR record data received at 314.

At 318, the QR record system 130 saves the new QR record to the QR record system data store 134.

At 320, and presuming the QR record saves correctly, the QR record system 130 generates a message creation confirmation message and communicates this to the user device 110.

At 322, the user device 110 receives the message creation confirmation message from the QR record system 130.

At 324, the user device 110 displays a confirmation message—for example "QR record created".

In certain embodiments, users may also or alternatively access a QR record creation interface from other applications running on user device 110.

For example, create new QR record controls may be provided in one or more collaboration tools 120. In this case, the collaboration system 120 is configured (either integrally or by a QR record system add-on/integration such as module 126) to provide a 'create QR record' control through its collaboration system client application 112. The control can be activated by a user interacting with the collaboration system 120 to launch a QR record creation interface and a QR record creation process like process 300 described above.

Where QR record creation is initiated via a collaboration system 120, the collaboration system 120 may redirect the user to a QR record system client application 114 (either web browser or dedicated application) to create the QR record. Alternatively, the collaboration system 120 may provide its own QR record creation interface (via the collaboration system client application 112). In this case, the collaboration system 120 handle interaction with the QR record system 130 itself—receiving user input via the collaboration system client 112 and passing this to the QR record system 130.

Providing collaboration system users with the ability to directly create QR records from the collaboration system simplifies matters for users wishing to provide help. Instead of having to manually switch from the collaboration system client application to an alternative application (e.g. QR record system client application 114), a user can access a QR record creation interface to create a QR record directly from whichever collaboration tool they are using.

For example, a user who has just created a wiki page on how to do X can, using the wiki collaboration too (i.e. without having to switch tools/applications), use the wiki to create a QR record (e.g. "How do I: X?") pointing to the page that has just been created. By way of further example, a user of an issue tracking system collaboration tool may set up a new issue template for an issue to start process Y. Using the issue tracking tool, the user can then create a new QR record (e.g. "How do I: get Y done?") with content indicating that a new issue should be created a link that causes a new issue to be created using the newly created issue template.

QR Record Discovery

This section describes processing performed in accordance with certain embodiments for a user to discover a QR record maintained by the QR record system 130. Two broad types of discovery are discussed: discovery involving a specific user search of QR records for assistance with a particular issue (referred to as manual discovery) and discovery in which a user's potential query is automatically detected and QR records searched in response (referred to as automatic discovery).

Manual QR Record Discovery

Manual discovery is performed by a user interacting with a QR record search interface. In the example described below, the QR record search interface is made available to the user via the QR record system client 114. In alternative embodiments, however, the QR record search interface could be made available from other applications. For example, a QR record search interface could also, or alternatively, be made available through an organization's wiki/intranet—for example a landing page, a staff search page, a contact us page, or any other page (in particular any pages which a user may visit when searching for help). A QR record search interface could also (or alternatively) be made available through a collaboration system client application 112.

Figure 5:
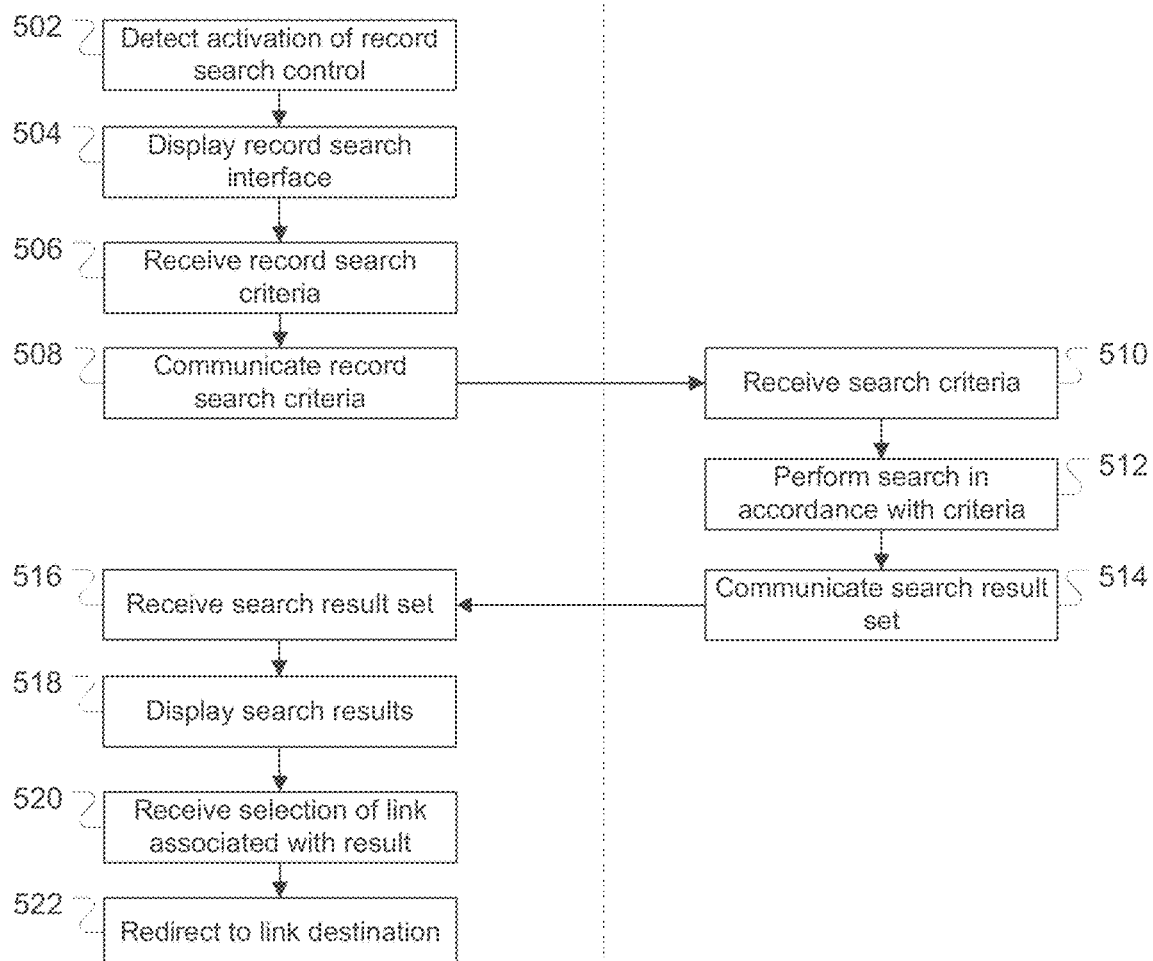
FIG. 5 is a flowchart indicating operations performed in a manual Query redirection record search.

Flowchart 500 of FIG. 5 provides processing performed in manual QR record discovery according to certain embodiments. As discussed above, operations performed by the user device 110 in the manual QR record discovery process may be performed by the device 110 under control of a QR record system client application 114, a collaboration system client application 112, or an alternative application running on the user device 110.

At 502, user device 110 detects activation of a QR record search control.

At 504, user device 110 displays a QR record search interface.

The QR record search interface includes one or more search criteria input controls for a user to define one or more search criteria. Various search criteria input controls may be provided. In certain embodiments, the search criteria input controls include a text field to enter freeform search text and a label selection tool to select one or more labels. A browse control may also be provided permitting, for example, a user to browse QR records. The browse control may be provided with sub-controls allowing a user to select to browse, for example, by QR record title (alphabetical order) label. As described below, various attributes of the QR records may be used to adjust the search results/order in which the search results are displayed (for example context and popularity/ratings).

Figure 6:
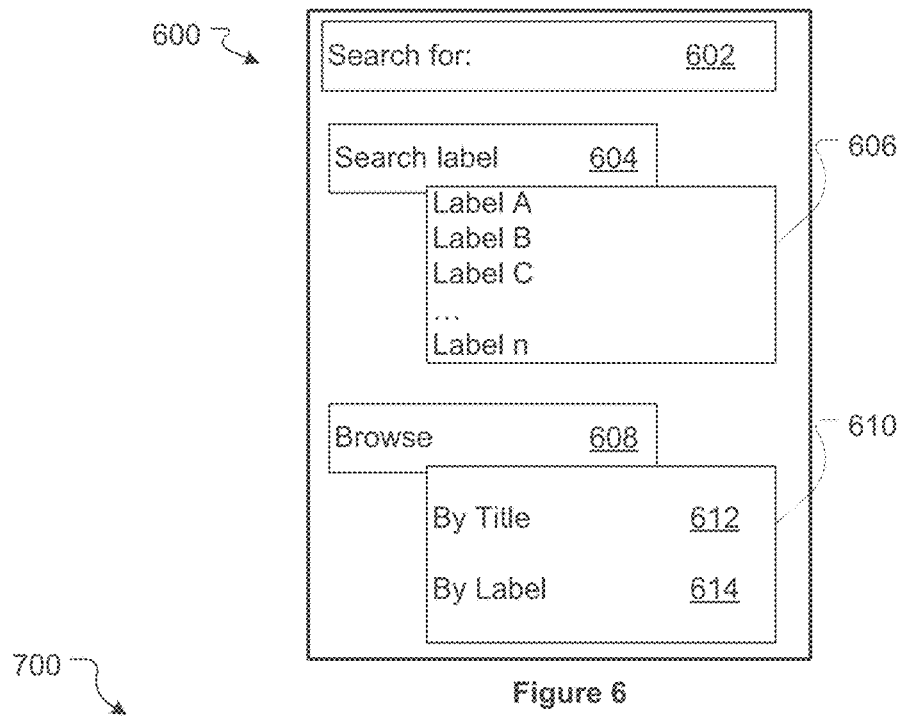
FIG. 6 is an example Query redirection record search interface.

FIG. 6 provides one example of a QR record search interface 600 for display on a display of user device 110. QR record search interface 600 includes: a text input control 602, allowing a user to enter text; a label selection control 604 which, when activated, causes user device 110 to display a list of labels 606 selectable by a user and that QR records are associated with; and a browse control 606 which, when activated, causes user device 110 to launch a sub-menu 610 allowing a user to select how they wish to browse—e.g. by title (control 612) or by label (control 614). Search interface 600 further includes a submit control 614 which, when activated, submits the user's search.

At 506, the user device 110 receives user input defining QR record search criteria. This input is received, for example, but user interacting with one or more of the search criteria input controls then activating a submit control or similar. In other embodiments, no 'submit' control is provided/needed, with search criteria being received/processed as it is entered by the user.

At 508, the user device 110 communicates the search criteria to the QR record system 130. Depending on how the QR record search interface is provided, the search criteria may be communicated from the user device 110 directly to the QR record system 130, or via another system (e.g. a collaboration system 120 where the search interface is provided by the collaboration system).

In certain embodiments, the user device 110 also communicates context information to the QR record system 130. Context information is in respect of the context in which the user input was received. This context information may be general—for example the collaboration tool that the user input was received in (e.g. an instant messaging system, a wiki system, an email program, an issue tracing system, etc.). The context information may also be more detailed: for example, a particular room in an instant messaging system, a particular page/sub-site maintained by a wiki system, a particular issue or project provide by an issue tracking system. The input control context information provides the QR record system 130 with information it can use to priorities search results (as discussed below).

At 510, the QR record system 130 receives the search criteria—either from the user device 110 directly or via another system. Where context information is communicated it too is received by the QR record system 130 at 510.

At 512, the QR record system 130 performs a search of QR records maintained on the QR record system data store 134 in accordance with the received search criteria. The search returns a search result set (which may be zero or more search results).

Continuing the implementation example described above (in which QR records are stored on a PostgreSQL database), QR record searching can be performed using PostgreSQL's built in search tools: tsvector and tsquery (to search by text and word stems). To improve the search, search results are ordered in priority of context and popularity/ratings. Prioritizing by context involves consideration of the container from which the search was launched. For example, if a user was searching from within an instant messaging system room, QR records that were created in that same room are priorities. Prioritizing by priority involves consideration of the popularity of the QR records returned by the search (using popularity metric such as the number of record views and shares).

At 514, the QR record system 130 communicates the search result set to the user device 110. Once again, this communication may be direct to the user device 110 or via another system.

At 516, the user device 110 receives the search result set, either directly from the QR record system 130 or via another system.

At 518, the user device 110 displays search results from the search result set in a search result interface. If the search result set does not include any results, the search result interface may display a message to this effect (optionally suggesting the user refine their search criteria and providing a 'revise search' control which when activated returns the user to the QR record search interface—e.g. at 504).

If the search result set includes one or more search results, these are displayed in the search result interface. In some cases, display of a given search result will involve displaying the entire QR record associated with that result (for example in a user interface like interface 400 with the exception that fields are not editable and no submit control is provided). In other cases, display of a given search result may be display of the title only (and if the title is selected by the user the title is expanded to display the entire QR record). In certain implementations, the way the search results are displayed depends on the number of search results. For example, if there are less than a defined number of search results (e.g. 3), the user device 110 displays complete/expanded QR records of all results, while if there are greater than the defined number of search results the user device 110 may display all results (or all bar the n highest scoring results) in an unexpanded/minimized form.

Figure 7:
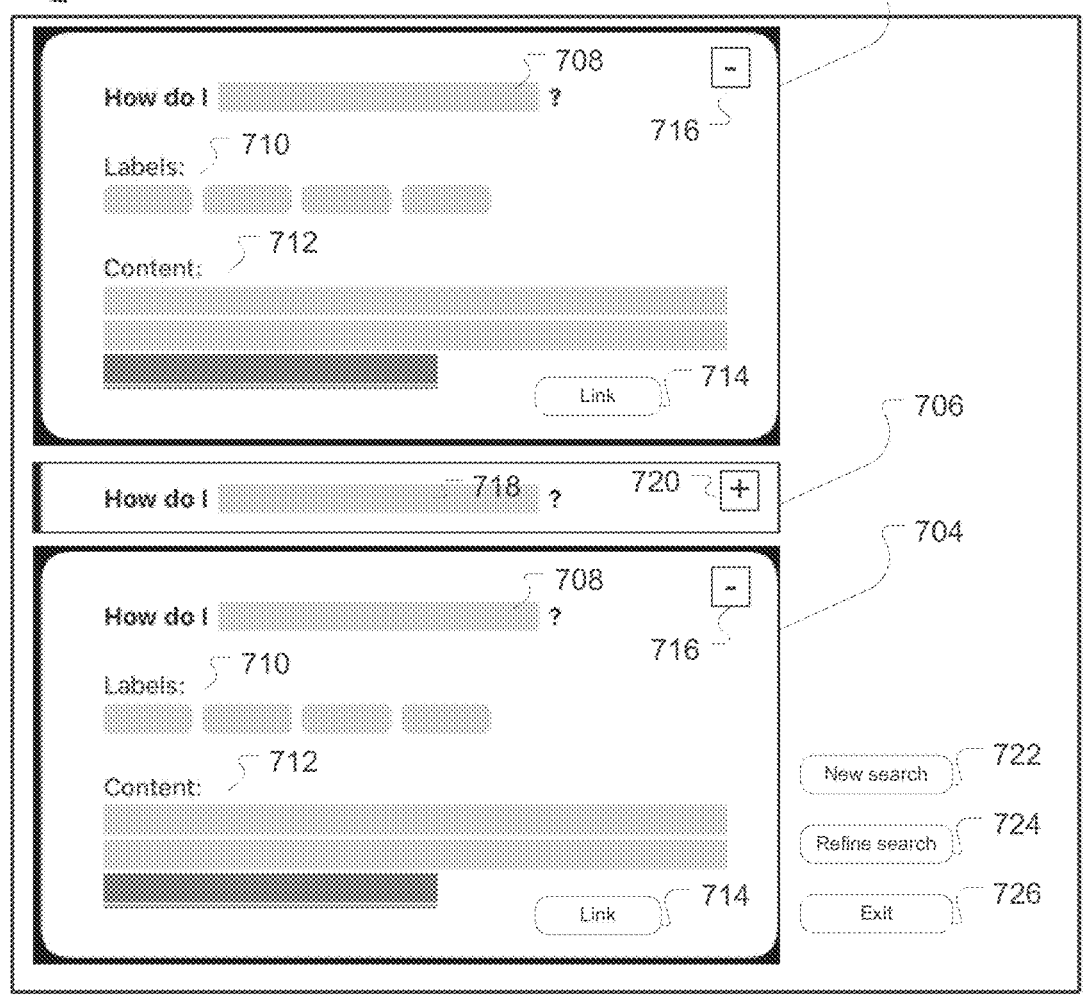
FIG. 7 is an example Query redirection record search results interface.

FIG. 7 provides one example of a search result interface 700 for display on a display of user device 110. Example search result interface 700 is in respect of a search that returned three QR records. Two QR records 702 and 704 are displayed in a full/expanded manner, and one QR record 706 is displayed in a summary/unexpanded manner.

Each expanded QR record 702 and 704 includes a QR record title 708 (displaying the title of the QR record), a label section 710 (displaying any labels in respect of the QR record), a content section 712 (displaying the QR record content), and a link control 714 (which can be activated by the user). Each expanded QR record further includes a reduce/minimize control 716 which, if activated, causes the QR record to be displayed in a summary/unexpanded manner (e.g. per QR record 706).

Summary QR record 706 is collapsed to include (in this example) only the title of the QR record 718 and an expand control 720 (which, if activated, causes the QR record to be displayed in an expanded manner per QR records 702 and 704).

Search result interface further includes a 'new search' control 722, a 'refine search' control 724, and an exit control 726.

At 520 and presuming that the search result set does include one or more search results, the user device 110 receives selection of a link associated with a particular search result QR record (e.g. by selection/activation of a displayed link control 714).

At 522, the user device 110 redirects the user to the destination indicated by the selected link. The precise redirection will depend on the destination of the link which—as discussed above—may be a link to a file or an interactive object. For example, if the search is being performed via a web application and the link is to a web page (e.g. an intranet/internet page, a web interface provided by a collaboration system, or an alternative web page), the redirect involves navigating to the linked web page (in either the current tab or, more usually, a new tab or new browser interface). Alternatively, if the link is to a specific collaboration tool that with a separate application client installed on the user device 110, the redirect involves launching (or surfacing a launched instance of) the relevant collaboration system client application 112 on the device 110 at the specific linked item (e.g. a page, an issue creation interface, a card creation interface, or other linked item).

Automatic QR Record Discovery

Figure 8:
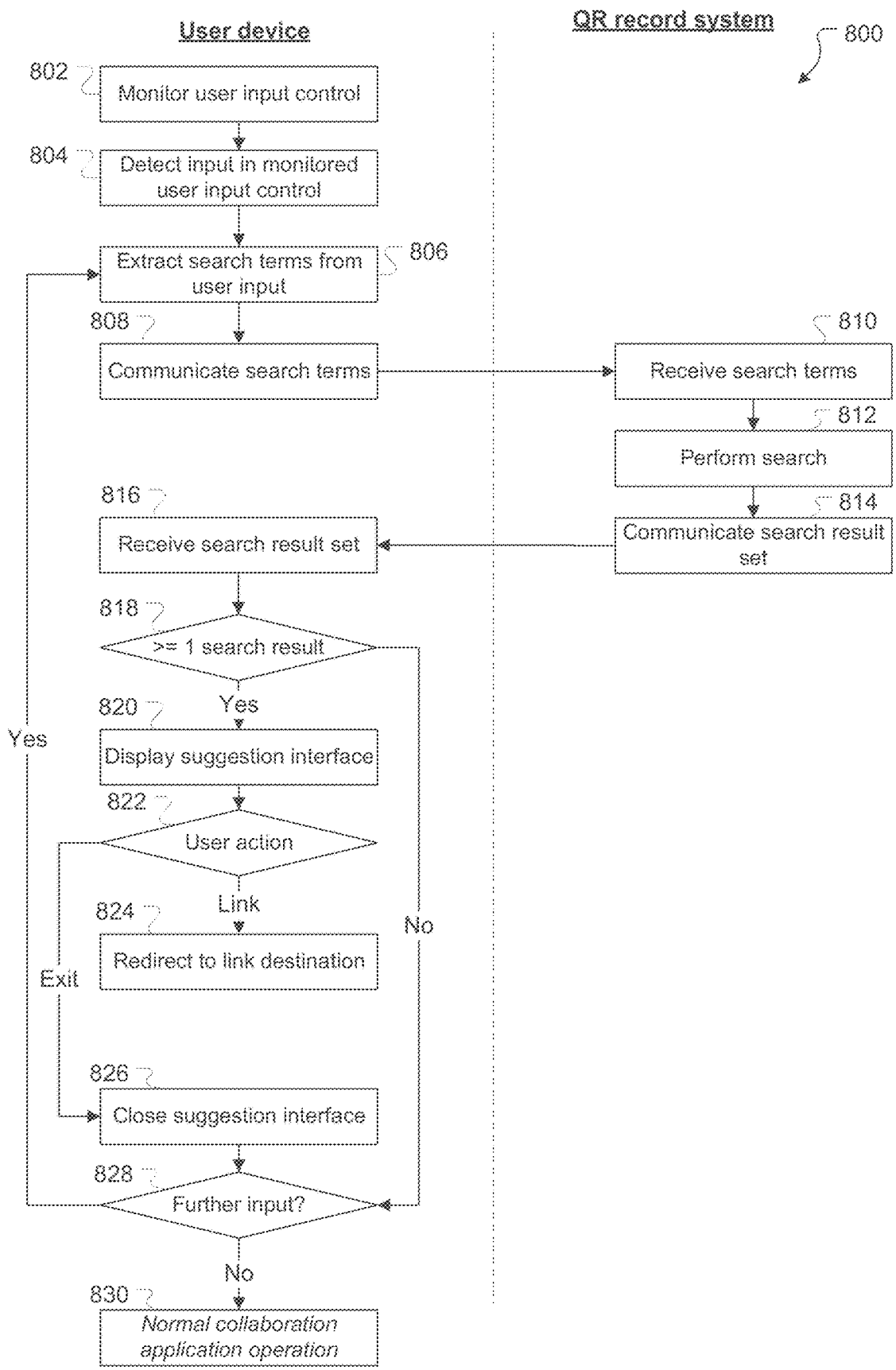
FIG. 8 is a flowchart indicating operations performed in an automatic Query redirection record search.

Automatic discovery is performed during normal user interaction with a collaboration tool (via a collaboration system client application 112 operating on the user device 112). Flowchart 800 of FIG. 8 provides processing performed in automatic QR record discovery according to certain embodiments.

The user device processing performed in automatic discovery is performed under the control of a collaboration system client application 112 (whether a dedicated application or web browser application. The collaboration system client application 112 causes display of a collaboration client interface to be displayed on the user device 110. The precise form and functionality provided by the collaboration client interface depend on the collaboration tool in question and the particular functionality of tool that is being used. For example, in the context of an instant messaging collaboration tool the collaboration client interface may be viewing the dialogue in a chat room and/or contributing to that chat room. In the context of a wiki collaboration tool or intranet, the collaboration client interface may be viewing specific pages. In the context of an issue tracking collaboration tool, the collaboration client interface may be an issue creation interface.

At 802, the user device 110 monitors one or more user input controls displayed in the collaboration tool interface. Any user input control may be monitored. Typically, user input controls permitting text entry, and which are used to ask questions or search for help will be monitored, but other user input controls may also be monitored (e.g. the email body input control of an email program).

For example, in the context of an instant messaging collaboration tool, one example of an appropriate user input control is the message submission interface (i.e. the interface which is used by a user to submit a comment/message to a room or other individual). In this case, the user may well use that control to ask questions of the room/individual—for example "hey—how do I connect to the WiFi?".

As another example, in the context of a wiki collaboration tool or intranet, one example of an appropriate user input control is the search interface where users enter search criteria. In this case, the user may well use that control to enter a search string such as "WiFi connection".

As a further example, in the context of an issue tracking tool, one example of an appropriate user input control is the 'issue description' field completed by a user when creating a new issue (or editing an existing issue)—e.g. by filling in a form or the like. In this case, data entry (e.g. typing) into the field/form is detected and potentially relevant QR records displayed/suggested to the user.

As yet a further example, an email editor may be configured to detect text entry into an email body and (again) used to identify/alert the user to potentially relevant QR records.

At 804, the user device 110 detects user input in a monitored user input control.

At 806, and in certain embodiments, the user device 110 extracts search terms from the user input received at 804. In alternative embodiments, the user device 110 communicates the entire user input received at 804 to the QR record system 130.

At 808, the user device 110 communicates the search terms (or the entire user input) to the QR record system 130. Depending on the collaboration system client application 112 in question, the search terms may be communicated from the user device 110 directly to the QR record system 130, or via another system (e.g. the collaboration system 120). In certain embodiments, the user device 110 also communicates context information to the QR record system 130, as described with respect to operation 508 above.

At 810, the QR record system 130 receives the search terms (or entire user input)—either from the user device 110 directly or via another system. Where provided, the QR record system 130 also receives the input control context information at 810.

At 812, the QR record system 130 performs a search of QR records maintained on the QR record system data store 134 in accordance with the received search terms. The search returns a search result set. In certain embodiments, the QR record system 130 is be configured to return all search results identified in the context of an automated search (or no results if there are none). In alternative embodiments, for an automated search the QR record system 130 is configured to return only the highest scoring search result (or no results if there are none). As with respect to operation 512 above, search results may be prioritized, for example based on context and/or popularity.

At 814, the QR record system 130 communicates the search result set to the user device 110 (directly or via another system).

At 816, the user device 110 receives the search result set, either directly from the QR record system 130 or via another system.

At 818, the user device 110 determines whether the search result set includes any search results. If so processing proceeds to 820. If not, processing proceeds to 828.

At 820, the user device 110 has determined that one or more search results have been returned. In this case the user device 110 displays a suggestion interface which includes the one or more QR records to which the search results relate. In certain embodiments the suggestion interface is a pop-up interface displayed in addition to (e.g. atop or beside) the collaboration client interface.

Figure 9:
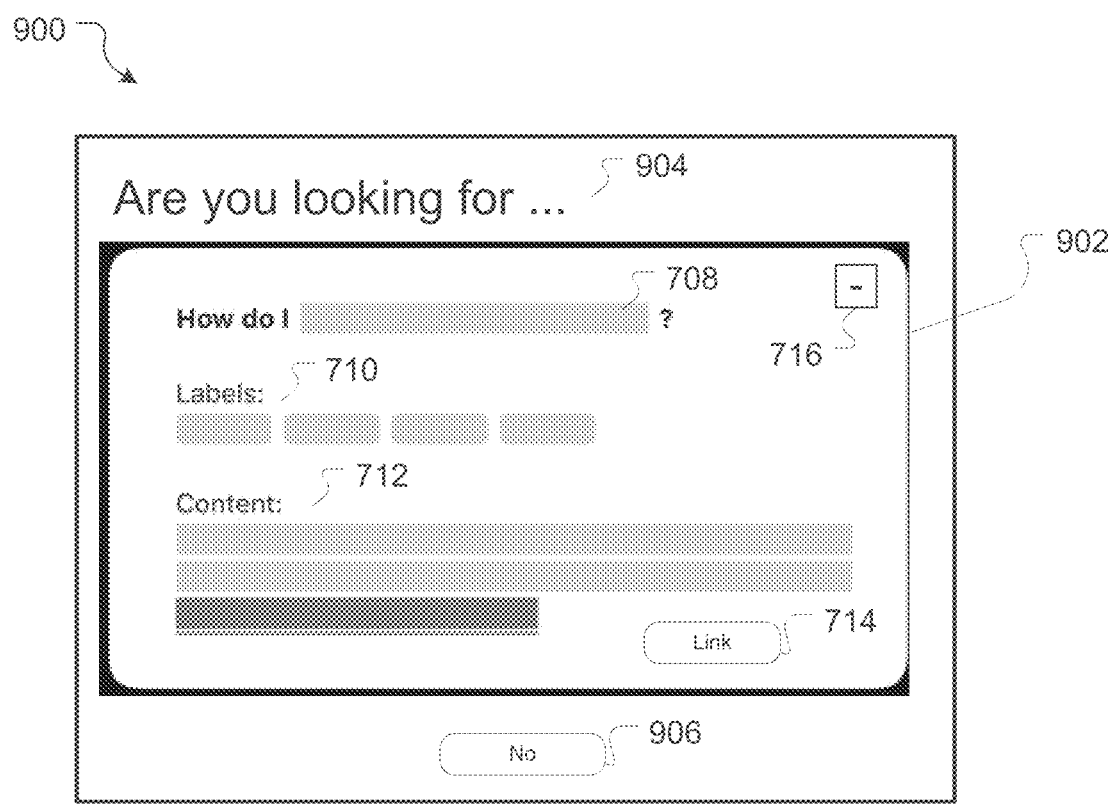
FIG. 9 is an example Query redirection record suggestion interface.

FIG. 9 provides an example suggestion interface 900. Suggestion interface 900 includes (in this particular case) a single QR record 902 in an expanded format. QR record 902 in its expanded format is like expanded QR records 702 and 704 described with reference to interface 700 above. Interface 900 further includes a suggestion notification 904 indicating to the user that the displayed QR record is a suggestion (in this case the alert being text reading "Are you looking for . . . "). Interface 900 further includes an exit control 906 (in this case labelled 'no') which when activated by the user closes the interface.

At 822, the user device 110 detects a user action with respect to the suggestion interface. In this example, the user action is either an 'exit' action (e.g. activation of an exit control such as control 906) or a link selection action (i.e. activation of a link in a displayed QR record such as link control 714). Further user interactions may be possible—for example where multiple QR records are displayed, interaction to expand/collapse particular QR records may also be received. If the user action is a link selection action, processing proceeds to 824. If the user action is an exit action, processing proceeds to 826.

At 824, the user device 110 has detected user selection of a QR record link. In this case the user device 110 redirects the user to the destination indicated by the selected link. This is like the redirection as described at 522 above, however in certain embodiments the redirection does not replace or cancel the user's current interaction with the collaboration system client application 112. This is to ensure that if the linked destination is not actually what the user is after they can return to where they were in the collaboration system client application 112 (e.g. by closing the linked destination, returning to the collaboration client interface and proceeding to 828).

If the linked destination does address the user's query, however, the user will normally abandon the submission of their input to the collaboration tool. In this case the user has successfully been deflected from continuing their search for help (or other action) within the collaboration tool. This is particularly advantageous in certain circumstances. For example, where collaboration system is an instant messaging system, deflecting the user in this way prevents the user from submitting their question to a chat room—thus reducing spam/irrelevant content in the chat room.

The linked destination may well be maintained by a different system to the collaboration system that the user is initially interacting with (i.e. a third system different to the QR record system and the instant collaboration system). Using, again, the instant messaging collaboration system as an example, a user may input data indicating they want to know how to connect to the WiFi (detected at 804). In response, the user device 110 may display a "How do I: connect to the WiFi?" QR record (at 820). The user may then activate the link associated with that QR record (detected at 822), and in response the user device may redirect (at 824) to a wiki page maintained by a wiki system (the wiki system being different to both the instant messaging and QR record systems).

At 826, the user device 110 has detected user selection of an exit control in the suggestion interface. In this case the suggestion interface is closed, and the collaboration client interface made visible/redisplayed. Processing then continues to 828.

At 828, the user device 110 has determined that no search results have been returned (at 818) or that the user is not interested in the returned search result(s) and has exited the suggestion interface (at 824). In this case the user device 110 determines whether further user input in a monitored user input control has been or is being received. If so processing returns to 806 to extract further search terms from the input and perform further QR record searching. If no, processing proceeds to 830.

At 830, no further input is being received in the monitored user input interface(s) and searching has not identified any relevant QR records. In this case processing continues as per normal for the collaboration client application 112 in question. Depending on the application this may, for example, involve the user activating a submit/enter control or similar which causes the user input to be submitted 'normally' for the application. Returning to the previous examples: if the input interface is a message submission interface of an instant messaging application, 'normal' operation will typically be to submit the user input to the room; if the input interface is a search interface of a wiki/intranet, 'normal' operation will typically involve invoking the wiki/intranet's search functionality (different, of course, to a search of QR records maintained by the QR record system 130); if the input interface is an 'issue description' field in an issue creation interface provided by an issue tracking application, 'normal' operation may involve submitting the created issue.

In certain implementations, process 800 is performed in real time as the user enters input into a monitored input control and without requiring the user to submit the input via a submission control. In alternative embodiments, process 800 requires a user to activate a submit control or similar. In this case, on activation of the submit control the user device 110 detects whether there is input in a monitored input control. If not, activation of the submit control is processed according to the collaboration tool's 'normal' operation (e.g. posting a message to a chat room, performing a wiki/intranet search, submitting an issue). If the user device 110 detects input in a monitored input control, however, rather than performing the 'normal' collaboration tool operation, the user device 110 performs a QR record search (e.g. per steps 806 to 816 of process 800. If no search results are returned, the user device then proceeds with 'normal' collaboration tool operation. If, however, search results are returned a suggestion interface is displayed providing the user an opportunity to select a link from a returned QR record instead of proceeding with the 'normal' collaboration tool operation.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method comprising:
causing display of, on a user device, a collaboration client interface to a collaboration system and a query redirection record system, the collaboration system comprising a collaboration system data store storing a set of collaboration records, the query redirection record system comprising a query redirection record system data store separate from the collaboration system data store and storing a set of query redirection records, each query redirection record of the set of query redirection records linking to a respective collaboration record of the set of collaboration records;
receiving a text input received by a user input control of the collaboration client interface;
determining a likelihood that the text input is directed to a query responsive to at least one query redirection record of the set of query redirection records;
in accordance with the likelihood not satisfying a criteria:
communicating at least a portion of the text input or data derived therefrom to the collaboration system data store; and
causing display of one or more collaboration records corresponding to at least the portion of the text input or the data derived therefrom; and
in accordance with the likelihood satisfying the criteria:
communicating at least the portion of the text input or the data derived therefrom to the query redirection record system data store;
in response to identifying one or more query redirection records corresponding to at least the portion of the text input or the data derived therefrom, causing display of the one or more query redirection records including a selectable link to the respective collaboration record; and
in response to identifying no query redirection records corresponding to at least the portion of the text input or the data derived therefrom, communicating at least the portion of the text input or the data derived therefrom to the collaboration system data store and causing display of the one or more collaboration records.

2. The computer implemented method of claim 1, further comprising:
detecting an activation of the selectable link; and
in response to detecting the activation of the selectable link, redirecting to the respective collaboration records, the respective collaboration records comprising help content.

3. The computer implemented method of claim 2, wherein, following redirection to the respective collaboration records, the text input received by the user input control is not submitted to the collaboration system data store.

4. The computer implemented method of claim 2, wherein, following redirection to the respective collaboration records, the computer implemented method further comprises:
detecting an activation of a submit control; and
in response to the activation of the submit control, submitting the text input to the collaboration system data store.

5. The computer implemented method of claim 1, wherein:
the one or more query redirection records include more than one query redirection record; and
the computer implemented method further comprises displaying the more than one query redirection record in an order of priority.

6. The computer implemented method of claim 5, wherein the order of priority is based on context associated with the text input.

7. The computer implemented method of claim 5, wherein the order of priority is based on a respective popularity of each query redirection record of the more than one query redirection record.

8. The computer implemented method of claim 1, wherein the collaboration client interface is a message creation interface provided by at least one of an instant messaging system, an issue tracking system, a wiki system, or an email system.

9. The computer implemented method of claim 1, wherein:
the one or more query redirection records further include a third party link; and
activation of the third party link redirects to a third party system different from the query redirection record system and the collaboration system.

10. A computer implemented method comprising:
maintaining a set of query redirection records in a query redirection record system data store, each query redirection record corresponding to a respective specific knowledge management question and comprising a respective title and a respective link, the respective title indicating the respective specific knowledge management question being addressed and the respective link indicating a respective destination within a collaboration system data store; and
in accordance with a determination that a text input is potentially relevant to at least one query redirection record of the set of query redirection records:
receiving, from a collaboration client interface, the text input comprising a search term related to a subject matter topic;
searching the set of query redirection records using the text input;
in response to identifying a result set of one or more query redirection records corresponding to the subject matter topic indicated in the text input, communicating the result set to the collaboration client interface; and
in response to identifying no query redirection records that correspond to the subject matter topic indicated in the text input, communicating the text input to the collaboration system data store for a successive search within the collaboration system data store.

11. The computer implemented method of claim 10, further comprising, in response to identifying the result set of the one or more query redirection records corresponding to the subject matter topic indicated in the text input, processing the result set to determine an order of priority of the one or more query redirection records.

12. The computer implemented method of claim 11, wherein the order of priority of the one or more query redirection records is based on context associated with the text input.

13. The computer implemented method of claim 11, wherein the order of priority of the one or more query redirection records is based on a popularity of the one or more query redirection records.

14. A computer device comprising:
a processor;
a communication interface;
a display; and
a non-transitory computer-readable storage medium storing sequences of instructions, which when executed by the processor, cause the processor to:
  display, on the display, a user interface for submitting content to a collaboration system and a query redirection record system, the collaboration system comprising a collaboration system data store storing a set of collaboration records, the query redirection record system comprising a query redirection record system data store separate from the collaboration system data store and storing a set of query redirection records, each query redirection record of the set of query redirection records linking to a respective collaboration record of the set of collaboration records;
  receive a text input from a user input control of the user interface, the text input comprising a search term related to a subject matter topic;
  in response to determining that the text input is potentially relevant to at least one query redirection record of the set of query redirection records:
    communicate at least a portion of the text input to the query redirection record system data store; and
    in response to identifying one or more query redirection records corresponding to at least the portion of the text input, cause display of the one or more query redirection records including a selectable link to respective collaboration records referenced by the one or more query redirection records; and
  in response to determining that the text input is not potentially relevant to at least the one query redirection record of the set of query redirection records:
    communicate at least the portion of the text input to the collaboration system data store; and
    cause display of one or more collaboration records corresponding to at least the portion of the text input.

15. The computer device of claim 14, wherein, when executed by the processor, the sequences of instructions further cause the processor to:
  detect an activation of the selectable link; and
  in response to detecting the activation of the selectable link, redirect to the respective collaboration records, the respective collaboration records comprising help content.

16. The computer device of claim 15, wherein, following redirection to the respective collaboration records, the text input received in the user input control is not submitted to the collaboration system data store.

17. The computer device of claim 14, wherein causing display of the one or more query redirection records comprises causing display of the one or more query redirection records in an order of priority.

18. The computer device of claim 17, wherein the order of priority is based on at least one of context associated with the text input or a respective popularity of each query redirection record of the one or more query redirection records.

19. The computer device of claim 14, wherein the user interface is a message creation interface provided by one of an instant messaging system application running on a user device, an issue tracking system application running on the user device, a wiki system application running on the user device, or an email system application running on the user device.

20. The computer device of claim 14, wherein:
  the one or more query redirection records further include a third party link; and
  activation of the third party link redirects to a third party system different from the query redirection record system and the collaboration system.

* * * * *